United States Patent
Tsukasaki et al.

(10) Patent No.: US 9,910,457 B2
(45) Date of Patent: Mar. 6, 2018

(54) EXPANSION DEVICE AND ELECTRONIC APPARATUS

(71) Applicant: FUJITSU LIMITED, Kawasaki-shi, Kanagawa (JP)

(72) Inventors: Haruka Tsukasaki, Kawasaki (JP); Shinya Matsushita, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 24 days.

(21) Appl. No.: 15/163,777

(22) Filed: May 25, 2016

(65) Prior Publication Data
US 2016/0349793 A1 Dec. 1, 2016

(30) Foreign Application Priority Data

May 27, 2015 (JP) .................................. 2015-107245

(51) Int. Cl.
*G06F 1/16* (2006.01)
(52) U.S. Cl.
CPC .................................. *G06F 1/1632* (2013.01)
(58) Field of Classification Search
CPC .................................................... G06F 1/1632
See application file for complete search history.

(56) References Cited

U.S. PATENT DOCUMENTS

| | | | | |
|---|---|---|---|---|
| 4,659,159 A * | 4/1987 | Takahashi | ............ | H01R 13/629 361/679.58 |
| 5,175,671 A * | 12/1992 | Sasaki | ............ | G06F 1/1632 361/679.43 |
| 5,321,580 A * | 6/1994 | Hosoi | ............ | G06F 1/1632 361/679.32 |
| 5,535,093 A * | 7/1996 | Noguchi | ............ | G06F 1/1632 361/679.43 |
| 6,135,801 A | 10/2000 | Helot et al. | | |
| 6,191,943 B1 * | 2/2001 | Tracy | ............ | G06F 1/1632 361/679.46 |
| 6,560,101 B1 | 5/2003 | Oross et al. | | |
| 7,379,295 B2 * | 5/2008 | Ke | ............ | G06F 1/1632 248/346.01 |
| 7,405,929 B1 * | 7/2008 | Chuang | ............ | G06F 1/1632 361/679.41 |
| 7,633,750 B2 * | 12/2009 | Fan | ............ | G06F 1/1632 361/679.41 |
| 2003/0147209 A1 * | 8/2003 | Oross | ............ | G06F 1/1632 361/679.4 |

(Continued)

FOREIGN PATENT DOCUMENTS

| | | |
|---|---|---|
| JP | 2000-10658 | 1/2000 |
| JP | 2002-91622 | 3/2002 |
| JP | 2005-182393 | 7/2005 |

*Primary Examiner* — Adrian S Wilson
(74) *Attorney, Agent, or Firm* — Fujitsu Patent Center

(57) ABSTRACT

An expansion device includes: a housing onto which an electronic device including a first connector is placed; a second connector, provided on the housing, configured to couple to the first connector; and a positioning member, including a projecting portion that projects from the housing, configured to displace, by a sliding operation with the electronic device being engaged, from a standby position in which the positioning member is restricted to sink into the housing to a coupling position in which the positioning member is allowed to sink into the housing and the first connector and the second connector are capable of coupling with each other.

20 Claims, 16 Drawing Sheets

(56) References Cited

U.S. PATENT DOCUMENTS

| | | | | |
|---|---|---|---|---|
| 2003/0202323 A1* | 10/2003 | Maeda | ................ | E05B 73/0082 361/679.41 |
| 2004/0145864 A1* | 7/2004 | Usui | .................... | G06F 1/1632 361/679.41 |
| 2005/0248917 A1* | 11/2005 | Hiroyoshi | ............. | G06F 1/1632 361/679.41 |
| 2008/0002345 A1* | 1/2008 | Carnevali | ............. | G06F 1/1632 361/679.41 |
| 2009/0213536 A1* | 8/2009 | Lewandowski | ....... | G06F 1/1632 361/679.43 |
| 2010/0265652 A1* | 10/2010 | Agata | ................... | G06F 1/1632 361/679.41 |

* cited by examiner

EXPANSION DEVICE AND ELECTRONIC APPARATUS

CROSS-REFERENCE TO RELATED APPLICATION

This application is based upon and claims the benefit of priority of the prior Japanese Patent Application No. 2015-107245, filed on May 27, 2015, the entire contents of which are incorporated herein by reference.

FIELD

The embodiment discussed herein is related to an expansion device and an electronic apparatus.

BACKGROUND

Some electronic devices such as notebook personal computers include a stationary unit, and a movable unit that is coupled to the rear end portion of the stationary unit and opens and closes with respect to the stationary unit.

Related art is disclosed in Japanese Laid-open Patent Publication No. 2000-10658, Japanese Laid-open Patent Publication No. 2005-182393, or Japanese Laid-open Patent Publication No. 2002-91622.

SUMMARY

According to an aspect of the embodiments, an expansion device includes: a housing onto which an electronic device including a first connector is placed; a second connector, provided on the housing, configured to couple to the first connector; and a positioning member, including a projecting portion that projects from the housing, configured to displace, by a sliding operation with the electronic device being engaged, from a standby position in which the positioning member is restricted to sink into the housing to a coupling position in which the positioning member is allowed to sink into the housing and the first connector and the second connector are capable of coupling with each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

For example, an expansion device is attached to a stationary unit to expand the capabilities of an electronic device.

An expansion device of this type includes, for example, a housing onto which the stationary unit is placed, and an expansion device-side connector that couples to a stationary unit-side connector provided in the stationary unit. The expansion device includes a positioning member with which the rear end portion of the stationary unit is engaged to position the stationary unit-side connector with respect to the expansion device-side connector.

When the movable unit of the electronic device is opened with respect to the stationary unit, the movable unit comes around behind the rear end portion of the stationary unit.

For example, when the movable unit is opened with respect to the stationary unit with the stationary unit attached to the expansion device, the movable unit may come into unwanted contact with the positioning member, which may limit the extent of opening movement of the movable unit.

One measure to address this problem is to, for example, allow the positioning member to sink into the expansion device as the movable unit comes into unwanted contact with the positioning member.

In this case, if the stationary unit runs onto the positioning member during attachment of the stationary unit to the expansion device, this may cause the positioning member to sink into the expansion device. This sinking of the positioning member into the expansion device may cause the expansion device-side connector and the stationary unit-side connector to come into contact with each other in a misaligned state, which may cause damage to the expansion device-side connector or the stationary unit-side connector.

Figure 1:
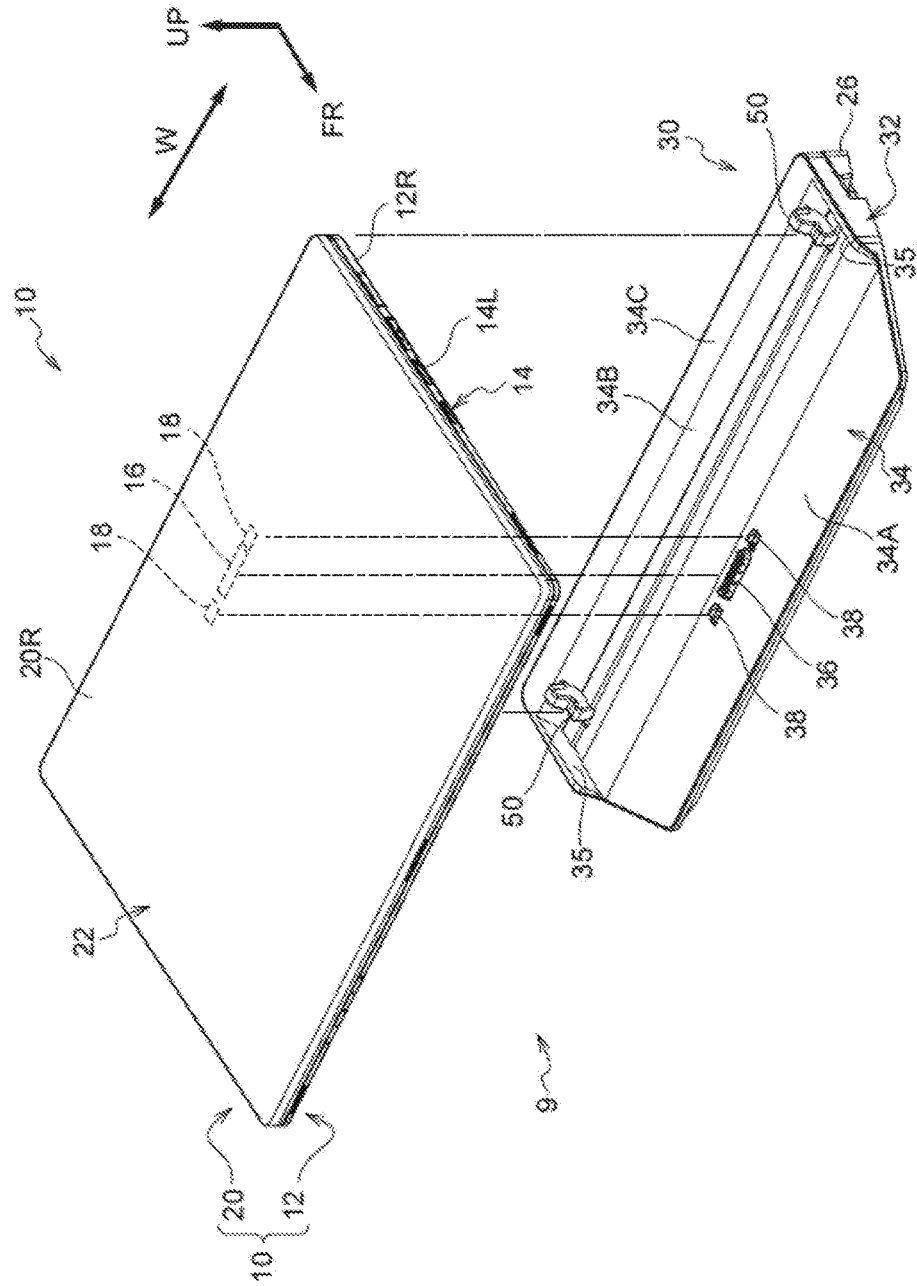
FIG. 1 is an exemplary perspective view of an expansion device.

FIG. 1 is an exemplary perspective view of an expansion device. FIGS. 2 to 5 are exemplary vertical sectional views of an expansion device. The expansion device in FIGS. 2 to 5 may be the expansion device illustrated as FIG. 1. An electronic apparatus 9 illustrated as FIG. 1 includes an electronic device 10, and an expansion device 30. The expansion device 30 may be, for example, a port replicator that is attached to the electronic device 10 to expand the capabilities of the electronic device 10. For example, the expansion device 30 has a plurality of connection terminals. The expansion device 30 provides the functions of a plurality of connection terminals to the electronic device 10 on which the expansion device 30 is attached. The connection terminals may be, for example, PS/2 ports, USB ports, or external display output connectors.

An arrow FR in each of the drawings indicates the front side in the front-back direction of the expansion device 30 and the electronic device 10 (the front as viewed along their depth). An arrow UP indicates the upper side in the height direction (top-bottom direction) of the expansion device 30 and the electronic device 10. An arrow W indicates the width direction (lateral width direction) of the expansion device 30 and the electronic device 10.

The electronic device 10 may be, for example, a notebook personal computer (to be referred to as "notebook PC" hereinafter). The electronic device 10 includes a stationary unit 12, and a movable unit 20. The stationary unit 12 has a unit housing 14. The unit housing 14 has a thin, box-like configuration. The unit housing 14 houses a printed circuit board (motherboard) on which a plurality of electronic components such as CPUs and memories are mounted.

A first connector 16 is provided on a bottom wall portion 14L of the unit housing 14. The first connector 16 is electrically coupled with the printed circuit board. The first connector 16 is exposed through an opening provided on the bottom wall portion 14L of the unit housing 14. Hook slots 18 are located in areas of the bottom wall portion 14L on both sides of the first connector 16.

The movable unit 20 has a unit housing 22. The unit housing 22 has a thin, box-like configuration. The unit housing 22 houses a display panel such as a liquid crystal panel.

The movable unit 20 is coupled to a rear end portion 12R of the stationary unit 12 via a hinge portion 24 (see FIG. 5) in a manner that allows the movable unit 20 to open and close. As the movable unit 20 pivots about the hinge portion 24, the movable unit 20 is displaced between a closed position in which the movable unit 20 is laid on the stationary unit 12, and an open position in which the movable unit 20 stands up relative to the stationary unit 12.

Figure 2:
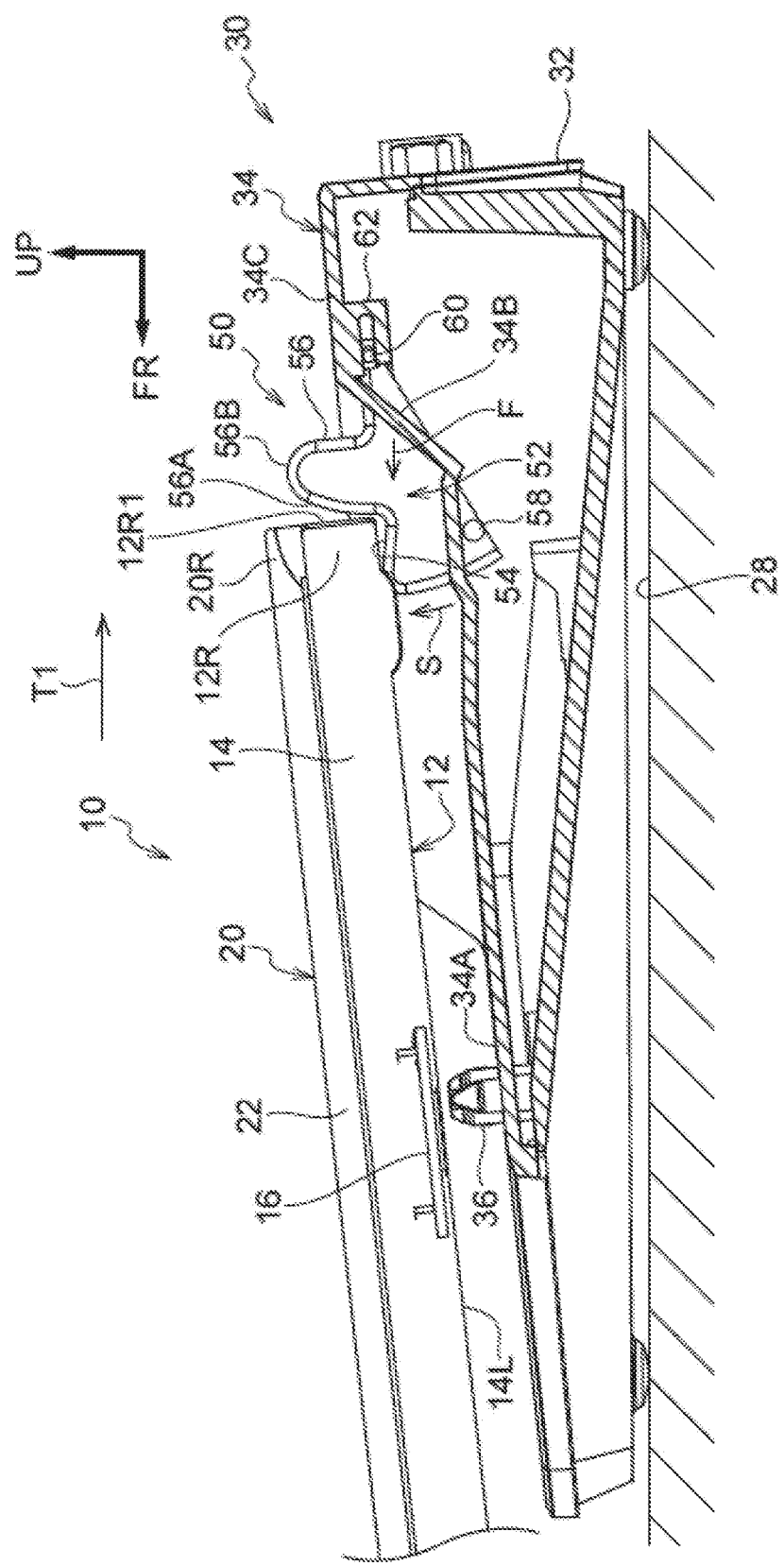
FIG. 2 is an exemplary vertical sectional view of an expansion device.
Figure 5:
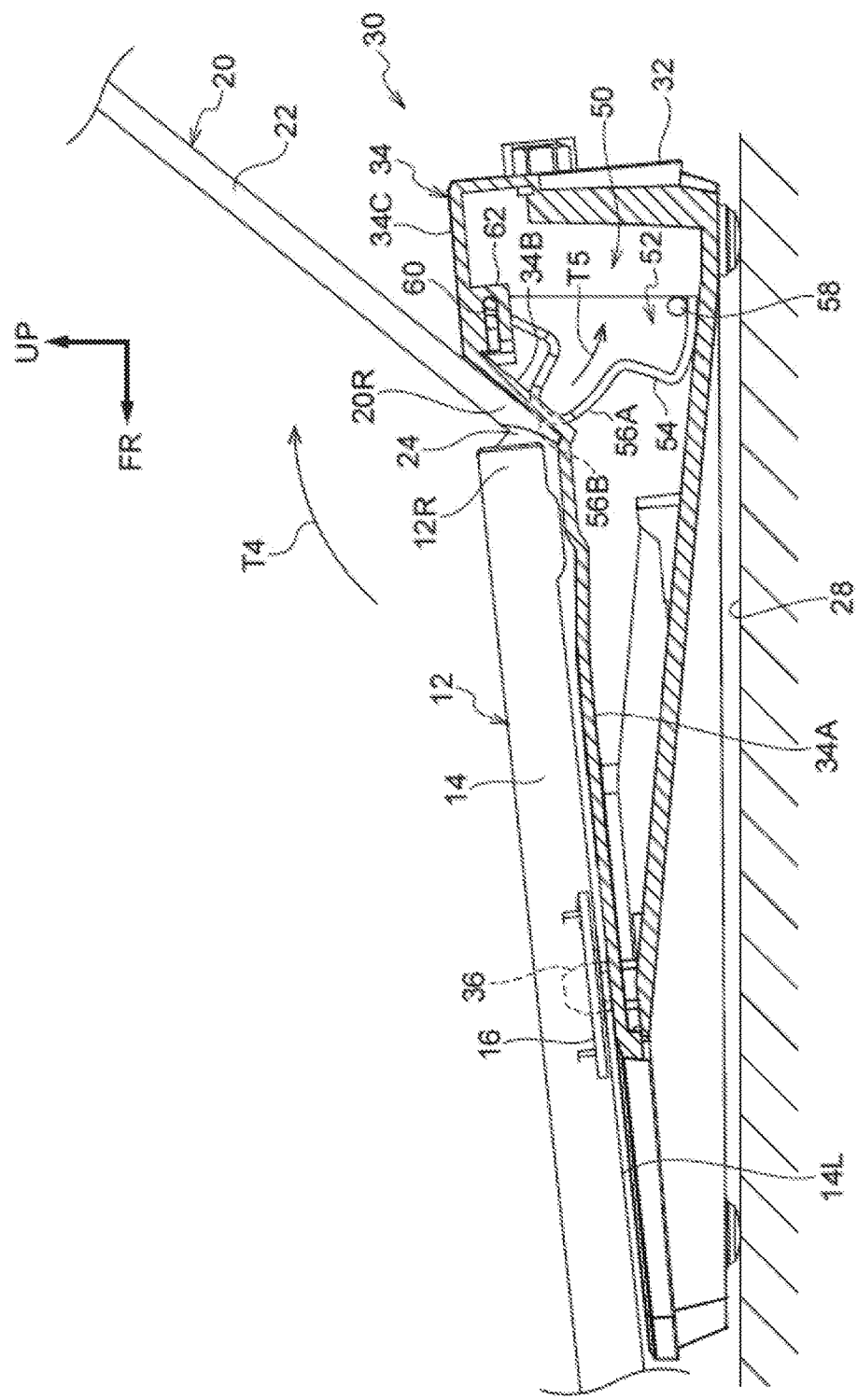
FIG. 5 is an exemplary vertical sectional view of an expansion device.

FIG. 2 illustrates the movable unit 20 in a closed position, for example, the movable unit 20 when closed (in a closed state) with respect to the stationary unit 12. FIG. 5 illustrates the movable unit 20 in an open position, for example, the movable unit 20 when opened (in an open state) with respect to the stationary unit 12. In the open position, a rear end portion 20R of the movable unit 20 comes around behind the rear end portion 12R of the stationary unit 12.

The expansion device 30 illustrated as FIG. 1 has a housing 32. The housing 32 has a thin, box-like configuration with its longitudinal direction oriented in the width direction (direction indicated by the arrow W). The housing 32 houses a printed circuit board on which a plurality of electronic components are mounted to expand the capabilities of the electronic device 10.

The housing 32 has a pair of guide wall portions 35, each located at either side in the width direction of the housing 32. Fitting the electronic device 10 between the guide wall portions 35 positions the electronic device 10 with respect to the housing 32. The guide wall portions 35 may be an example of a widthwise-positioning portion.

An upper wall portion 34 of the housing 32 includes a placing portion 34A, a sloping wall portion 34B, and a top wall portion 34C. The placing portion 34A extends over the area of the upper wall portion 34 from the front end side to the middle portion. The placing portion 34A slopes gently upward with respect to the front-back direction of the housing 32 as the placing portion 34A extends rearward. The rear portion of the stationary unit 12 is placed on the placing portion 34A.

The placing portion 34A is provided with a second connector 36. The second connector 36 projects upward through an opening that is located in the middle portion along the width of the placing portion 34A. The second connector 36 and the first connector 16 of the stationary unit 12 electrically couple to each other. When the first connector 16 and the second connector 36 are electrically coupled with each other, a signal is exchanged between the electronic device 10 and the expansion device 30. For example, when a storage medium such as a USB memory is coupled to one of the connection terminals of the expansion device 30, the expansion device 30 acts as a relay between the storage medium and the electronic device 10. The expansion device 30 transmits, to the electronic device 10, a signal given to the expansion device 30 from the storage medium. The expansion device 30 transmits, to the storage medium, a signal given to the expansion device 30 from the electronic device 10 via a signal cable.

Hooks 38 are provided in areas of the placing portion 34A located on both sides of the second connector 36 in the width direction. As the first connector 16 and the second connector 36 are coupled to each other, each of the hooks 38 is inserted into the corresponding hook slot 18 of the stationary unit 12, and locked onto a locking engagement portion provided in the stationary unit 12. This restricts detaching of the stationary unit 12 from the expansion device 30.

An operating lever 26 is provided in one widthwise end portion of the housing 32. For example, the operating lever 26 is operated by the user to release the locking engagement between the locking engagement portion of the stationary unit 12 and the hook 38, and the stationary unit 12 is detached from the expansion device 30. The operating lever 26 may be an example of an operating member.

The sloping wall portion 34B is located rearward of the placing portion 34A. As illustrated as FIG. 5, the sloping wall portion 34B is located rearward of the movable unit 20 with the movable unit 20 in its open position. The sloping wall portion 34B slopes relative to the placing portion 34A in accordance with the angle of slope of the movable unit 20. For example, the sloping wall portion 34B slopes with respect to the front-back direction of the housing 32 so as to rise upward toward the rear side of the housing 32.

As illustrated as FIG. 1, a pair of positioning members 50 for positioning the second connector 36 with respect to the first connector 16 is provided at each side of the sloping wall portion 34B in the width direction of the housing 32. The positioning members 50 are spaced apart from each other in the width direction of the housing 32.

Figure 6:
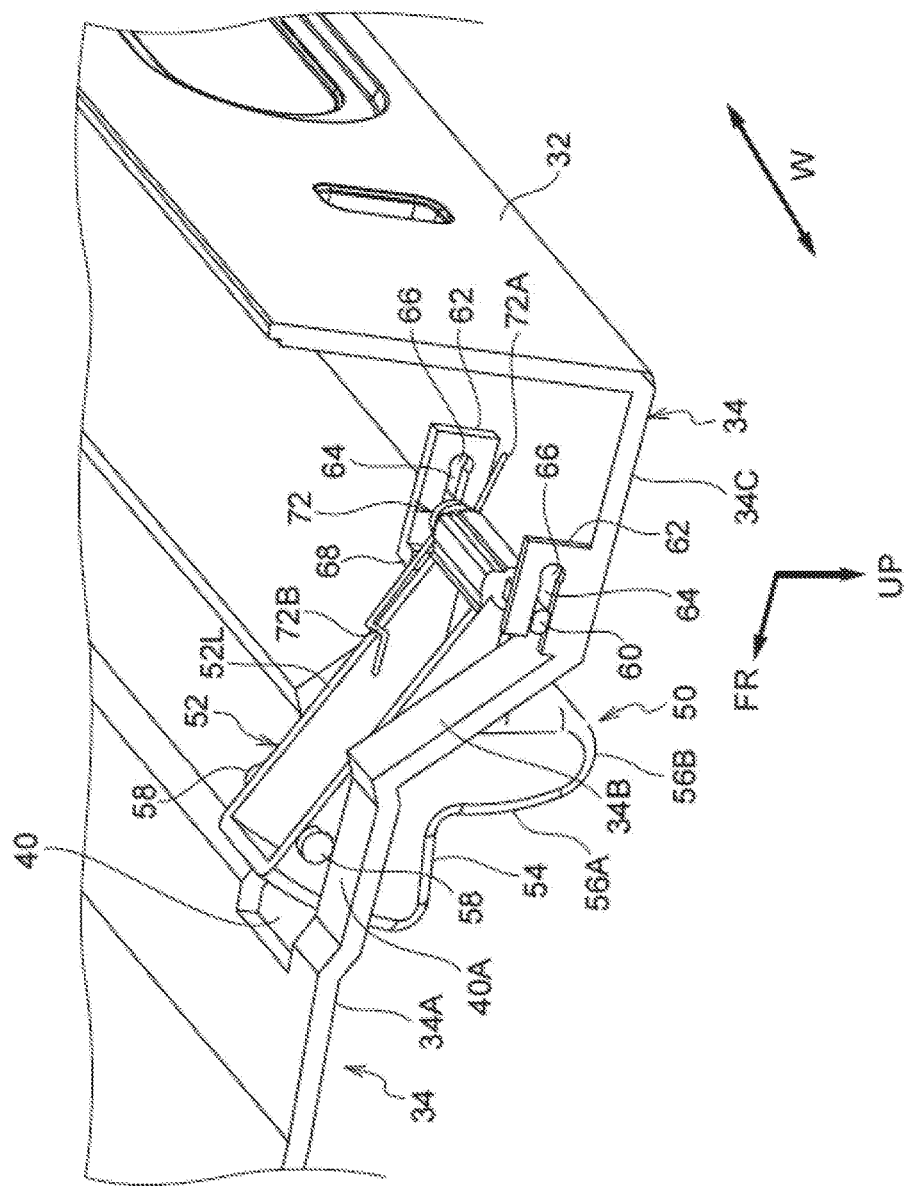
FIG. 6 is an exemplary perspective view of a positioning member.
Figure 7:
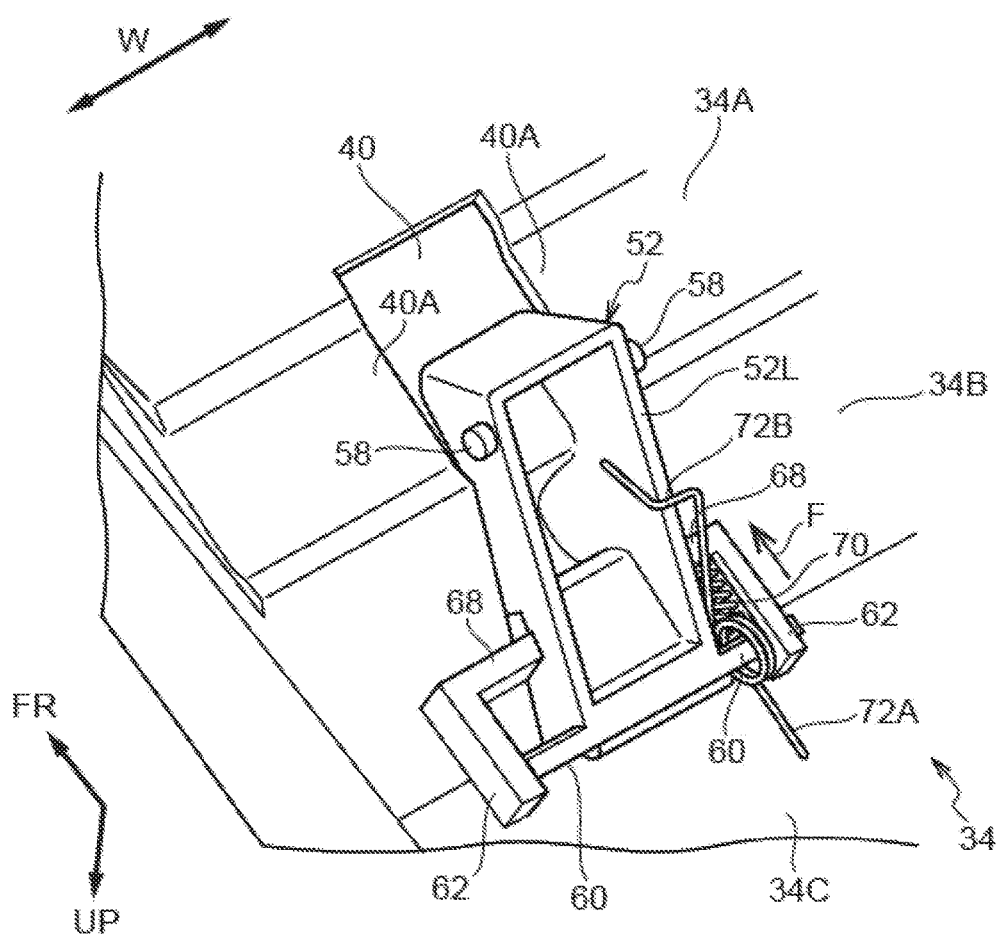
FIG. 7 is an exemplary perspective view of a positioning member.

FIGS. 6 and 7 are exemplary perspective views of a positioning member. FIGS. 6 and 7 depict the positioning member illustrated as FIG. 1 as viewed diagonally from below. As illustrated as FIGS. 6 and 7, the upper wall portion 34 of the housing 32 includes an opening 40 having a rectangular shape whose longitudinal direction is oriented in the front-back direction of the housing 32. The opening 40 extends over the placing portion 34A and the sloping wall portion 34B. The positioning member 50 is disposed in the opening 40.

Figure 8:
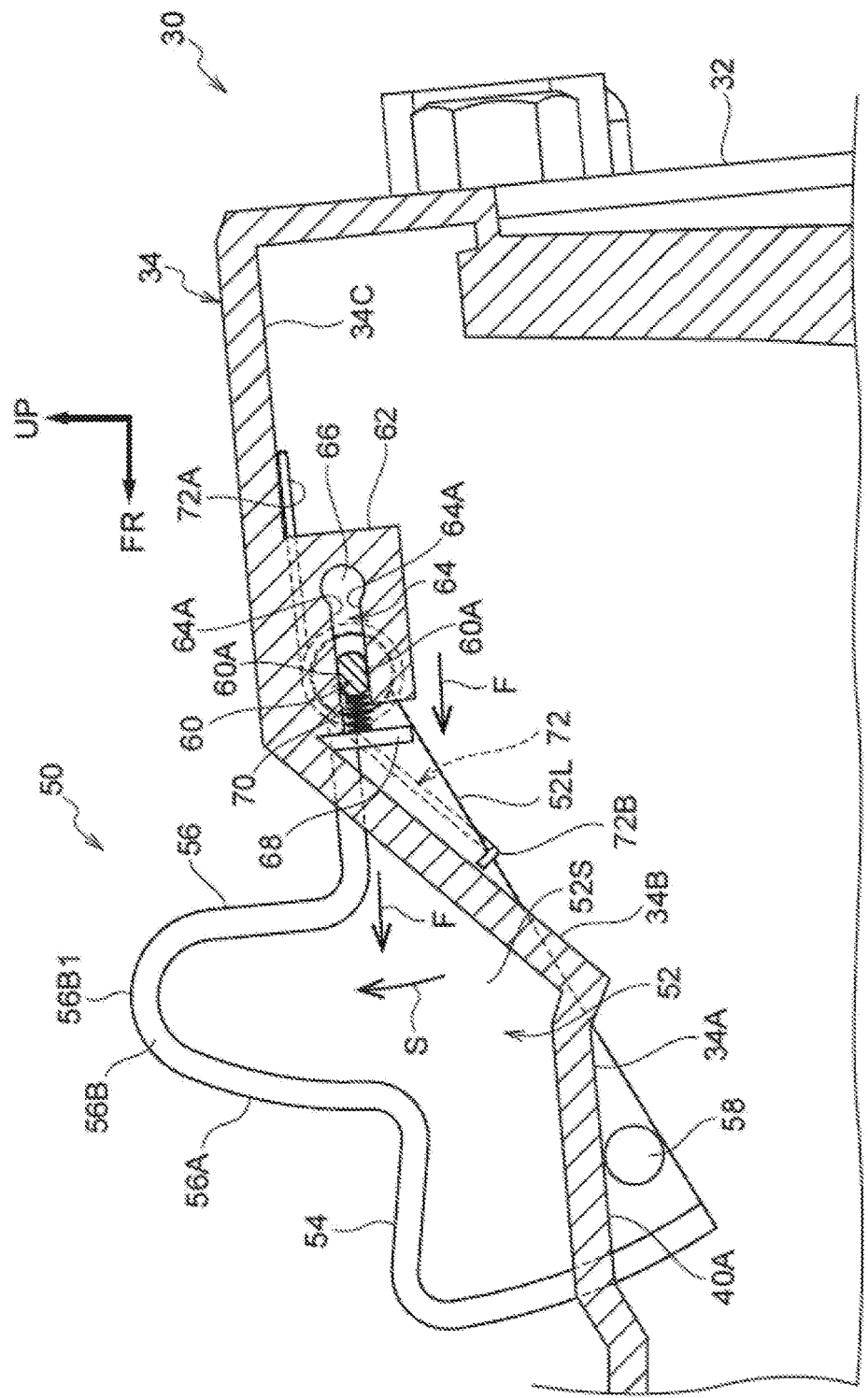
FIG. 8 is an exemplary enlarged view of an expansion device.
Figure 9:
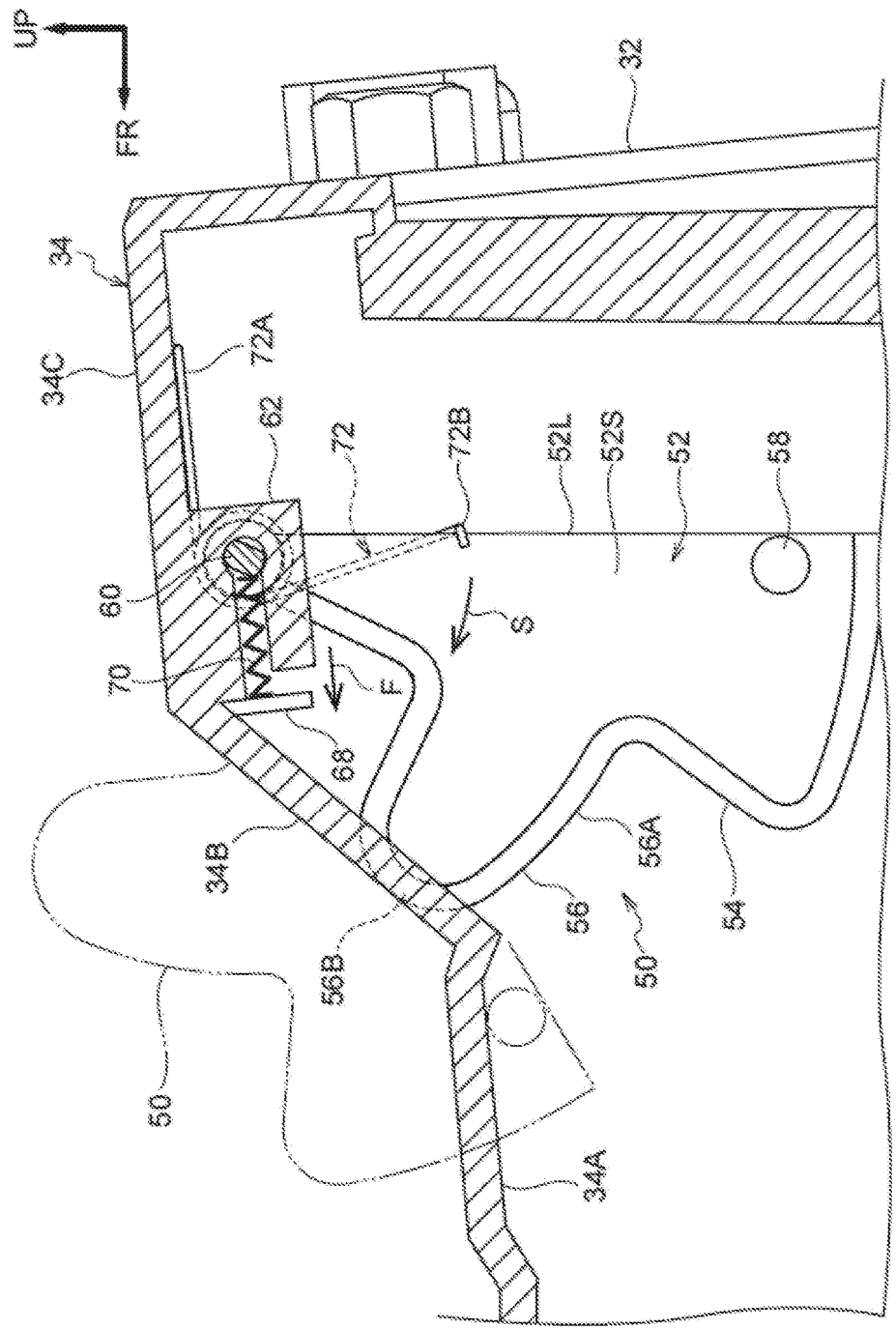
FIG. 9 is an exemplary enlarged view of an expansion device.
Figure 10:
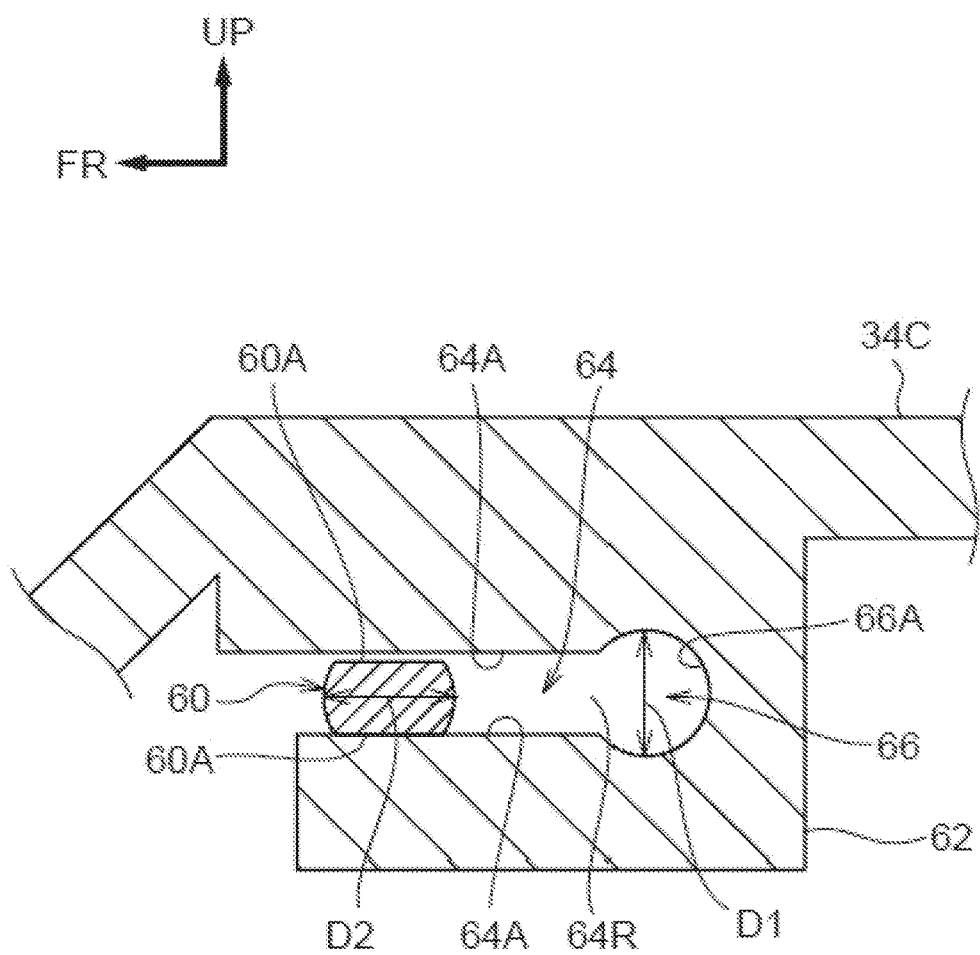
FIG. 10 is an exemplary enlarged view of an expansion device.

FIGS. 8, 9, and 10 are exemplary enlarged views of an expansion device. FIG. 8 is an enlarged view of the expansion device illustrated as FIG. 2. FIG. 9 is an enlarged view of the expansion device illustrated as FIG. 5. FIG. 10 is an enlarged view of the expansion device illustrated as FIG. 8. As illustrated as FIG. 8, with the positioning member 50 in its standby position prior to attaching of the stationary unit 12 to the expansion device 30, an upper portion of the positioning member 50 projects upward from the upper wall portion 34 of the housing 32 through the opening 40. When in the standby position, the positioning member 50 is restricted from sinking into the housing 32.

The positioning member 50 is attached to a guide passage 64, and able to slide within the opening 40 in the front-back direction of the housing 32. As the positioning member 50 slides in the front-back direction of the housing 32, the positioning member 50 is displaced between the standby position (position illustrated as FIG. 2) and a connecting position (position illustrated as FIG. 3) located further rearward than the standby position. As illustrated as FIGS. 4 and 5, in the connecting position, the positioning member 50 is permitted to sink into the housing 32.

When the electronic device 10 is placed on the expansion device 30 with the positioning member 50 of the expansion device 30 in its standby position, no connection is established between the first connector 16 provided on the bottom wall portion 14L of the electronic device 10, and the second connector 36 provided on the upper wall portion 34 of the expansion device 30. For example, the first connector 16 and the second connector 36 are not facing each other. Since the positioning member 50 is restricted from sinking into the housing 32 in this state, a space is created between the bottom wall portion 14L of the electronic device 10 and the upper wall portion 34 of the expansion device 30, the space having a height equal to the amount by which cutouts (a seating portion 54 and a projecting portion 56) in the positioning member 50 on which the rear end portion 12R of the electronic device 10 may be placed are exposed from the housing 32. When the stationary unit 12 of the electronic device 10 is moved rearward (arrow T1), the first connector 16 moves closer to the second connector 36 by an amount equal to the distance by which the stationary unit 12 of the electronic device 10 has been moved rearward.

When the electronic device 10 is placed on the expansion device 30 with the positioning member 50 of the expansion device 30 in its connecting position, a connection may be made between the first connector 16 provided on the bottom wall portion 14L of the electronic device 10, and the second connector 36 provided on the upper wall portion 34 of the expansion device 30. For example, the first connector 16 and the second connector 36 are facing each other. The first connector 16 and the second connector 36 are thus coupled to each other by pressing the electronic device 10 toward the expansion device 30.

In the following description, unless otherwise specified, wordings used for the positioning member 50 to indicate directions, such as "up (top)", "down (bottom)", "front", and "back (rear)", are defined with reference to the orientation of the positioning member 50 when in its standby position.

As illustrated as FIG. 8, the positioning member 50 has a main body portion 52, and a pivot shaft 60. The upper portion of the main body portion 52 includes the seating portion 54, and the projecting portion 56. The seating portion 54 is located at the front side of the upper portion of the main body portion 52. The seating portion (seating surface) 54 may be a flat portion (flat surface) on which the rear end portion 12R of the stationary unit 12 is placed. The projecting portion 56 is located rearward of the seating portion 54. The upper portion of the main body portion 52 may be an example of a projecting portion of the positioning member 50 that projects from the housing 32.

The projecting portion 56 projects upward above the seating portion 54. The front surface of the projecting portion 56 may be an engagement portion 56A (engagement surface) with which an end face 12R1 (see FIG. 2) of the rear end portion 12R of the stationary unit 12 is engaged. As illustrated as FIG. 2, with the movable unit 20 in the closed state, and with the rear end portion 12R of the stationary unit 12 placed on the seating portion 54, the engagement portion 56A covers the rear end portion 12R of the stationary unit 12 and the rear end portion 20R of the movable unit 20 from behind.

As illustrated as FIG. 8, the top portion of the projecting portion 56 may be a pressure application portion 56B that is pressed downward by the rear end portion 20R of the movable unit 20 as the movable unit 20 is opened. An upper surface 56B1 of the pressure application portion 56B may be a curved surface that has an upward convex shape when projected from the housing 32 and as viewed from the axial direction of the pivot shaft 60 (the width direction of the housing 32). This reduces unwanted catching of the rear end portion 20R on the upper surface 56B1 of the pressure application portion 56B when the upper surface 56B1 of the pressure application portion 56B is pressed downward by the rear end portion 20R (see FIG. 5) of the movable unit 20.

A pair of locking pins 58 is provided in a part of the main body portion 52 below the seating portion 54. The locking pins 58 project in the width direction of the housing 32 from a side surface 52S on each side of the main body portion 52. The locking pins 58 are locked onto a peripheral edge portion 40A of the opening 40 from the inside of the housing 32. This restricts the positioning member 50 from making a pivotal movement in a direction (direction indicated by an arrow S) in which the positioning member 50 projects upward from the housing 32. The locking pin 58 may be an example of a locking portion.

The pivot shaft 60 is provided in the rear end portion of the main body portion 52. For example, the pivot shaft 60 is located further rearward than the seating portion 54 and the pressure application portion 56B. The pivot shaft 60, which has a cylindrical shape, projects in the width direction of the housing 32 from the side surface 52S at each side of the main body portion 52. The outer peripheral surface of the pivot shaft 60 has a pair of engagement surfaces 60A. The engagement surfaces 60A, which may be flat surfaces that are parallel to each other, are located at both sides of the pivot shaft 60. With the positioning member 50 in its standby position, the engagement surfaces 60A are located at both sides in the top-bottom direction of the pivot shaft 60.

The top wall portion 34C is located rearward of the sloping wall portion 34B. The top wall portion 34C is provided with a pair of support wall portions 62 that support the pivot shaft 60. The support wall portions 62 project downward from the lower surface of the top wall portion 34C, and are spaced apart from each other in the width direction of the housing 32. The rear end portion of the positioning member 50 is disposed between the support wall portions 62.

The guide passage 64 is provided in each of the support wall portions 62. As illustrated as FIG. 10, the guide passage 64 may be an elongated groove or elongated hole that extends in the front-back direction of the housing 32. The pivot shaft 60 of the positioning member 50 is slidably inserted into the guide passage 64. The guide passage 64 has a pair of inner wall surfaces 64A. The inner wall surfaces 64A are opposed to each other in the height direction (top-bottom direction) of the housing 32. The engagement surfaces 60A of the pivot shaft 60 are engaged with the corresponding inner wall surfaces 64A, thus restricting pivotal movement of the pivot shaft 60. For example, pivotal movement of the pivot shaft 60 is restricted within the guide passage 64.

Either one of the engagement surfaces 60A may not be provided. The guide passage 64 may be an example of a guide portion.

A pivotal movement-permitting hole 66 is provided in a part of each of the support wall portions 62 located rearward of the guide passage 64. The pivotal movement-permitting hole 66 has a circular shape. The pivotal movement-permitting hole 66 is coupled with an end portion 64R of the guide passage 64 located near the connecting position (at the rear side of the guide passage 64). The pivot shaft 60 is thus able to move between the guide passage 64 and the pivotal movement-permitting hole 66. Movement of the pivot shaft 60 to the pivotal movement-permitting hole 66 brings the positioning member 50 into the connecting position.

The pivotal movement-permitting hole 66 may have a diameter D1 slightly larger than a diameter D2 of the pivot shaft 60. This allows pivotal movement of the pivot shaft 60 within the pivotal movement-permitting hole 66. For example, when in its connecting position, the positioning member 50 becomes able to pivot about the pivot shaft 60. As the positioning member 50 pivots downward about the pivot shaft 60, the positioning member 50 sinks into the housing 32. The pivotal movement-permitting hole 66 may be an example of a pivotal movement-permitting portion.

As illustrated as FIG. 7, the respective front end portions of the support wall portions 62 have opposed wall portions 68. The opposed wall portions 68, which are located forward of the pivot shaft 60, are opposed to the pivot shaft 60 in the front-back direction of the housing 32. A first elastic member 70 is disposed between one of the opposed wall portions 68 and the pivot shaft 60.

The first elastic member 70 may be, for example, a coil spring. The first elastic member 70, which may be a tension spring, is coupled to the opposed wall portion 68 and the pivot shaft 60. The pivot shaft 60 may be urged toward the opposed wall portion 68 at all times by the urging force (tensile force) F of the first elastic member 70. The positioning member 50 may be urged by the first elastic member 70 at all times so as to slide from the connecting position toward the standby position.

A second elastic member 72 is disposed around the pivot shaft 60. The second elastic member 72 may be, for example, a torsion spring. As illustrated as FIG. 8, one end portion 72A of the second elastic member 72 is locked onto the top wall portion 34C of the housing 32, and another end portion 72B is locked onto a lower surface 52L of the main body portion 52. The second elastic member 72 may urge the positioning member 50 at all times in a direction (direction indicated by the arrow S) in which the positioning member 50 projects upward from the housing 32.

The following describes a method of attaching (mounting) the electronic device 10 to the expansion device 30.

FIG. 8 illustrates the positioning member 50 in its standby position. In the standby position, the seating portion 54, the engagement portion 56A, and the pressure application portion 56B of the positioning member 50 project upward from the housing 32. In the standby position, the engagement surfaces 60A of the pivot shaft 60 are engaged with the corresponding inner wall surfaces 64A of the guide passage 64, thus restricting pivotal movement of the pivot shaft 60.

In this state, first, the rear end portion 12R of the stationary unit 12 is placed on the seating portion 54 of the positioning member 50 as illustrated as FIG. 2. The stationary unit 12 moves rearward (arrow T1). The rearward movement of the stationary unit 12 brings the end face 12R1 of the rear end portion 12R of the stationary unit 12 into engagement with the engagement portion 56A of the positioning member 50.

Figure 3:
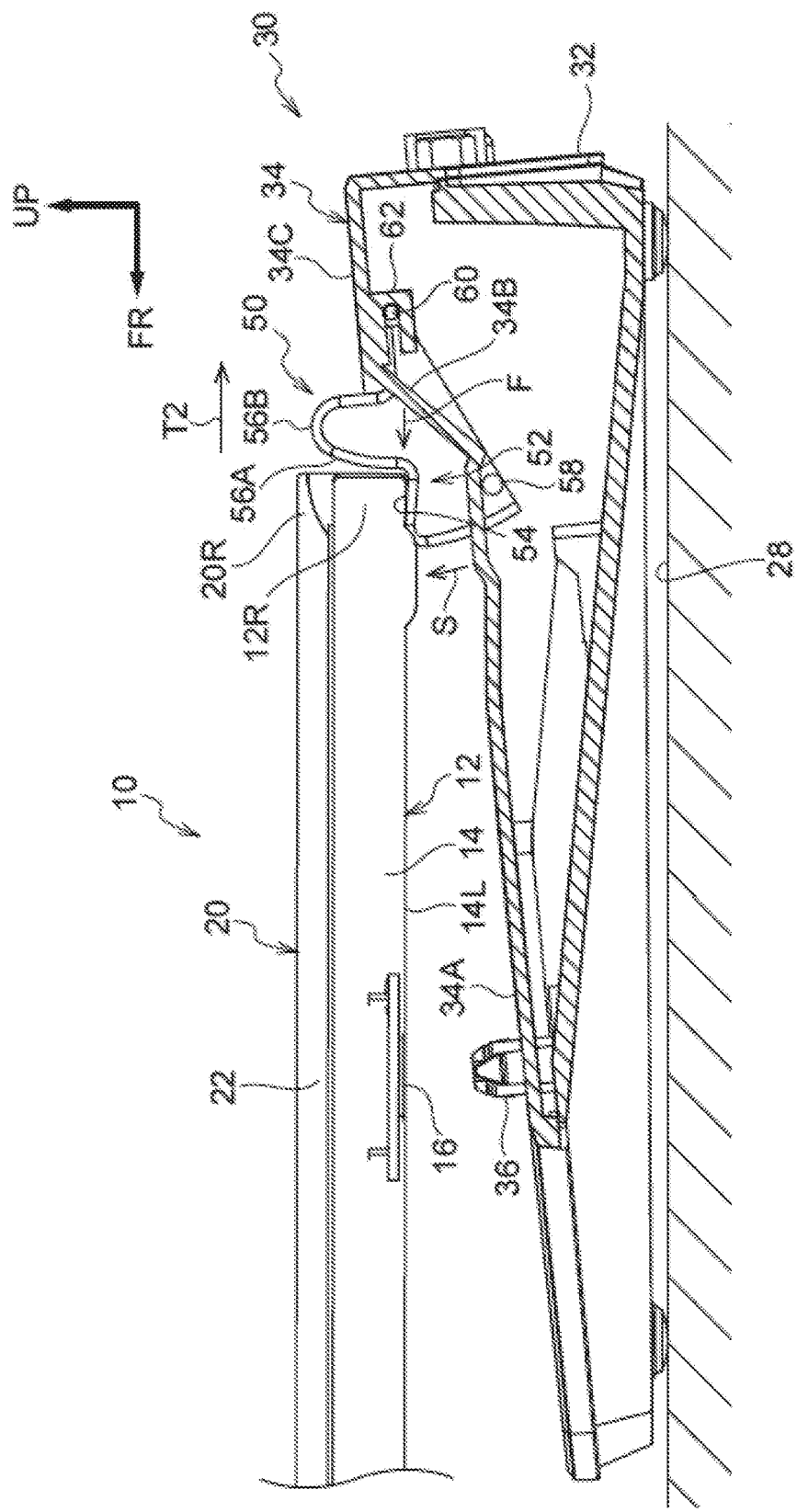
FIG. 3 is an exemplary vertical sectional view of an expansion device.

As illustrated as FIG. 3, as the stationary unit 12 moves further rearward against the urging force F (see FIG. 9) of the first elastic member 70 (arrow T2), the pivot shaft 60 of the positioning member 50 slides rearward along the guide passage 64. At this time, as illustrated as FIG. 10, the engagement surfaces 60A of the pivot shaft 60 are engaged with the corresponding inner wall surfaces 64A of the guide passage 64, thus restricting pivotal movement of the pivot shaft 60. For example, the positioning member 50 slides rearward along the guide passage 64 while being restricted from sinking (moving pivotally) into the housing 32.

After moving rearward along the guide passage 64, the pivot shaft 60 reaches the pivotal movement-permitting hole 66. For example, this causes the positioning member 50 to be displaced from the standby position to the connecting position. In the connecting position, the first connector 16 of the stationary unit 12 is positioned with respect to the second connector 36 of the expansion device 30 as illustrated as FIG. 3. As illustrated as FIG. 9, in the connecting position, the pivot shaft 60 is capable of pivotal movement.

In the connecting position, the pivot shaft 60 abuts on an inner peripheral wall 66A of the pivotal movement-permitting hole 66 (see FIG. 10), thus restricting rearward sliding movement of the pivot shaft 60. For example, the inner peripheral wall 66A of the pivotal movement-permitting hole 66 may serve as a stopper that restricts rearward movement of the pivot shaft 60.

Figure 4:
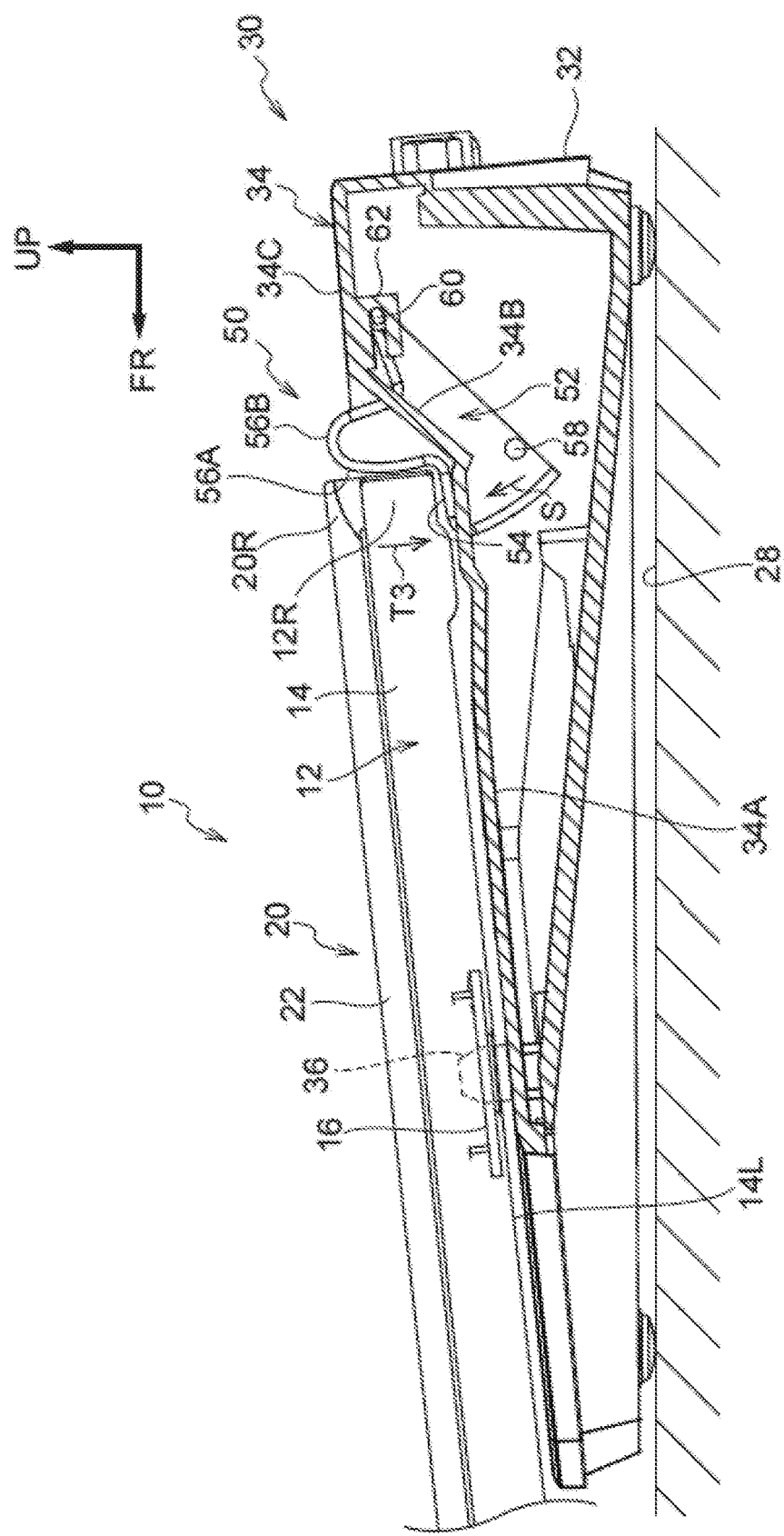
FIG. 4 is an exemplary vertical sectional view of an expansion device.

As illustrated as FIG. 4, when the rear end portion 12R of the stationary unit 12 is pressed downward (arrow T3) against the urging force S of the second elastic member 72 (see FIG. 9), the seating portion 54 of the positioning member 50 is pressed downward. Thus, the positioning member 50 pivots about the pivot shaft 60, and sinks into the housing 32. As a result, the first connector 16 of the stationary unit 12 is coupled to the second connector 36 of the expansion device 30. The electronic device 10 is thus attached to the expansion device 30.

As illustrated as FIG. 1, the hook 38 on each side of the second connector 36 is inserted into the corresponding hook slot 18 located on each side of the first connector 16, and the hook 38 is locked onto the locking engagement portion of the stationary unit 12. This restricts detaching of the electronic device 10 from the expansion device 30.

As illustrated as FIG. 5, when the movable unit 20 is opened with respect to the stationary unit 12 in this state (arrow T4), the pressure application portion 56B of the positioning member 50 is pressed downward by the rear end portion 20R of the movable unit 20. This causes the positioning member 50 to further pivot and sink into the housing 32 about the pivot shaft 60 (arrow T5). As a result, limiting of the opening movement of the movable unit 20 by the positioning member 50 may be reduced.

The following describes a method of detaching the stationary unit 12 from the expansion device 30.

FIG. 5 illustrates a state (open state) in which the stationary unit 12 when attached to the expansion device 30, with the movable unit 20 opened (in an open state) with respect to the stationary unit 12. In this state, first, the movable unit 20 is closed with respect to the stationary unit 12 as illustrated as FIG. 4. Thus, the urging force S of the second elastic member 72 causes the positioning member 50 to pivot about the pivot shaft 60 in a direction (direction indicated by the arrow S) in which the positioning member 50 projects from the housing 32.

Next, the operating lever 26 (see FIG. 1) is operated to release the locking engagement between the locking engagement portion of the stationary unit 12 and the hook 38, allowing detaching of the electronic device 10 from the expansion device 30. When, for example, the user lifts the stationary unit 12 upward in this state, the connection between the first connector 16 and the second connector 36 is released, and the electronic device 10 is detached from the expansion device 30.

When the rear end portion 12R of the stationary unit 12 is lifted upward, as illustrated as FIG. 3, the urging force S of the second elastic member 72 causes the positioning member 50 to pivot about the pivot shaft 60 in a direction (direction indicated by the arrow S) in which the positioning member 50 projects from the housing 32. Then, when the locking pin 58 of the positioning member 50 is locked onto the peripheral edge portion 40A of the opening 40, the pivotal movement of the positioning member 50 is arrested (restricted).

With the locking pin 58 of the positioning member 50 locked onto the peripheral edge portion 40A of the opening 40, the engagement surfaces 60A of the pivot shaft 60 are parallel to the corresponding inner wall surfaces 64A of the guide passage 64, thus allowing the pivot shaft 60 to move within the guide passage 64. As a result, as illustrated as FIG. 2, the urging force F of the first elastic member 70 causes the pivot shaft 60 to enter the guide passage 64 and then slide forward along the guide passage 64, causing the positioning member 50 to be displaced into the standby position.

Figure 11:
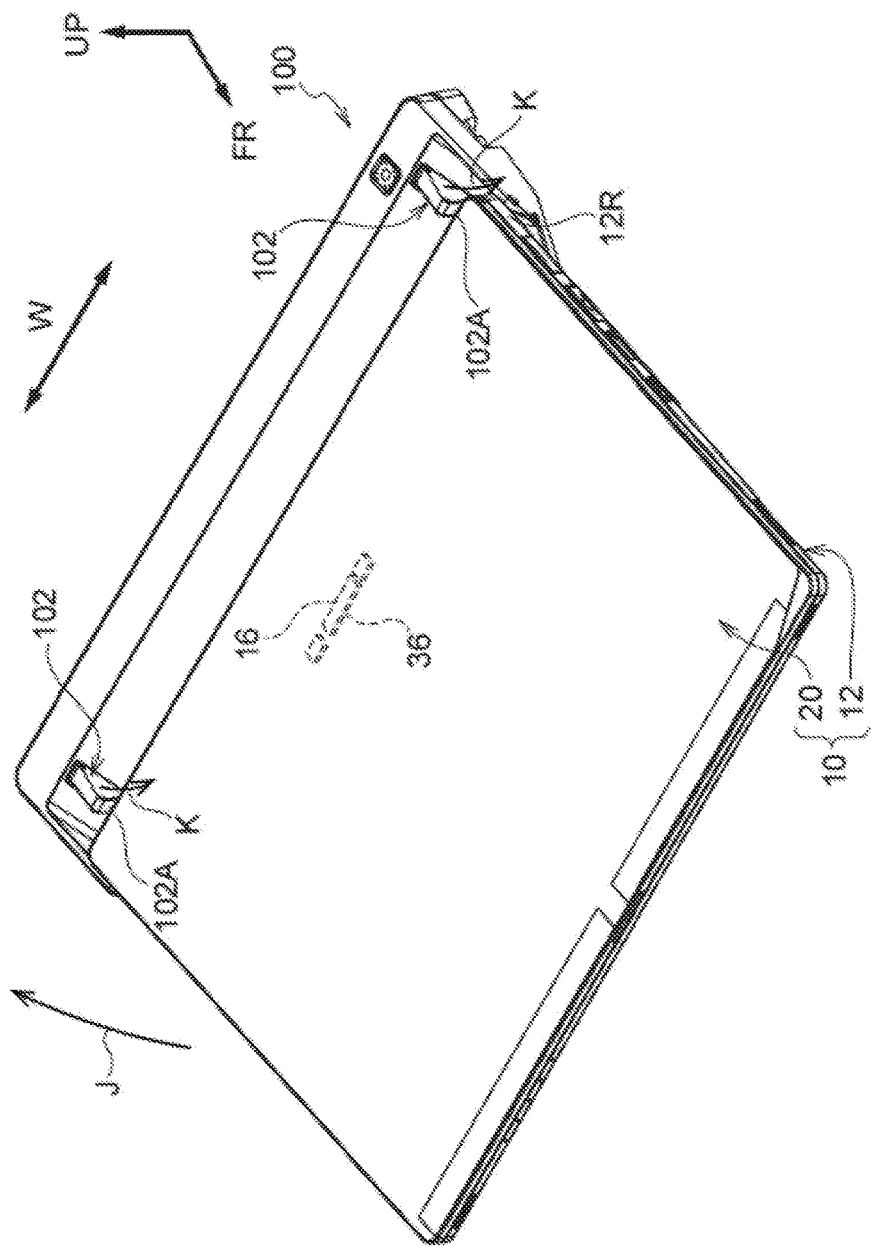
FIG. 11 is an exemplary perspective view of an expansion device.
Figure 12:
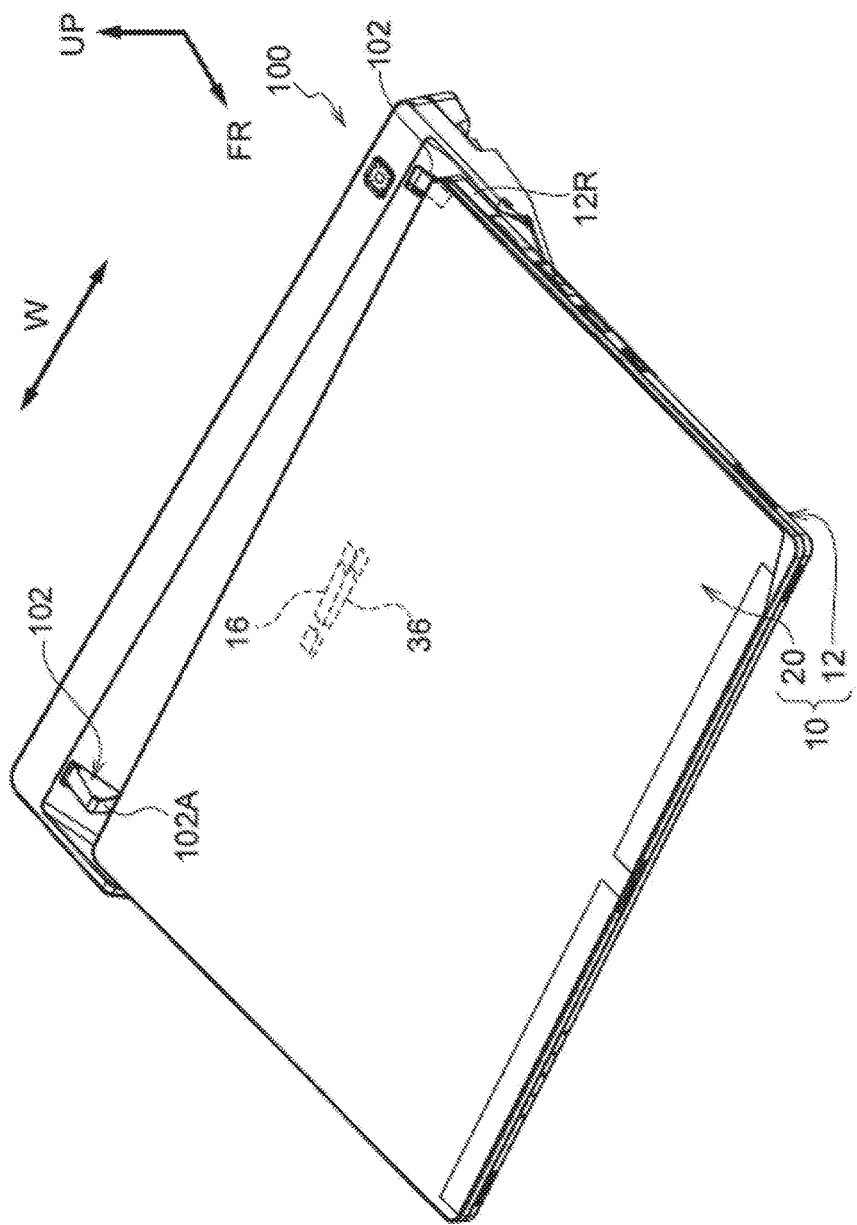
FIG. 12 is an exemplary perspective view of an expansion device.

FIGS. 11 and 12 are exemplary perspective views of an expansion device. FIGS. 11 and 12 illustrate an expansion device as viewed diagonally from above. As illustrated as FIG. 11, in an expansion device 100 according to Comparative Example, the rear end portion 12R of the stationary unit 12 (see FIG. 2) is brought into engagement with an engagement portion 102A of each of a pair of positioning members 102, thus positioning the first connector 16 and the second connector 36 with respect to each other. The positioning members 102 do not slide in the front-back direction of the housing 32. Further, the positioning members 102 are capable of sinking into the housing 32 at all times.

In the expansion device 100 illustrated as FIG. 11, the positioning members 102 sink into the housing 32 (the direction indicated by an arrow K) as the movable unit 20 is opened (the direction indicated by an arrow J). Thus, the opening movement of the movable unit 20 is not restricted by the positioning members 102, thus allowing for a wider range of opening movement of the movable unit 20.

As illustrated as FIG. 12, if, for example, the rear end portion 12R of the stationary unit 12 runs onto (the right) one of the positioning members 102 during attachment of the stationary unit 12 to the expansion device 30, the positioning member 102 sinks into the housing 32. If the first connector 16 and the second connector 36 come into contact with each other in a misalignment state, this may cause damage to the first connector 16 or the second connector 36. If the first connector 16 and the upper wall portion 34 of the expansion device 30 come into contact with each other, this may cause damage to the first connector 16. If the second connector 36 and the bottom wall portion 14L of the electronic device 10 come into contact with each other, this may cause damage to the second connector 36.

In the expansion device 30 illustrated as FIGS. 1 to 10, the positioning member 50 is able to slide in the front-back direction along the guide passage 64 of the housing 32. As illustrated as FIG. 8, prior to attaching the electronic device 10 to the expansion device 30, the positioning member 50 is located in its standby position. In the standby position, the engagement surfaces 60A of the pivot shaft 60 are in engagement with the corresponding inner wall surfaces 64A of the guide passage 64, thus restricting pivotal movement of the pivot shaft 60.

This configuration reduces sinking of the positioning member 50 into the housing 32, even if the rear end portion 12R of the stationary unit 12 runs onto the pressure application portion 56B rather than the seating portion 54 of the positioning member 50 during attachment of the electronic device 10 to the expansion device 30. As a result, contact between the first connector 16 of the stationary unit 12 and the second connector 36 of the expansion device 30 in a misaligned state is reduced. Therefore, damage to the first connector 16 or the second connector 36 is reduced.

For example, as illustrated as FIG. 3, when the positioning member 50 is displaced from the standby position to the connecting position, the first connector 16 is positioned with respect to the second connector 36, and the positioning member 50 becomes able to pivot about the pivot shaft 60. Pushing the stationary unit 12 toward the expansion device 30 in this state couples the first connector 16 to the second connector 36.

In the connecting position, the positioning member 50 is able to pivot about the pivot shaft 60. Thus, as illustrated as FIG. 5, when the pressure application portion 56B of the positioning member 50 is pressed downward by the rear end portion 20R of the movable unit 20 as the movable unit 20 is opened, the positioning member 50 pivots about the pivot shaft 60, and sinks into the housing 32. As a result, limiting of the opening movement of the movable unit 20 by the positioning member 50 is reduced. This increases the extent of opening of the movable unit 20.

This configuration may allow for an increased extent of opening of the movable unit 20, while reducing damage to the first connector 16 or the second connector 36 caused by running of the stationary unit 12 onto the positioning member 50.

The upper surface 56B1 of the pressure application portion 56B has a curved surface that is curved in an upward convex shape as viewed in the axial direction of the pivot shaft 60 (the width direction of the housing 32). This reduces unwanted catching of the rear end portion 20R on the upper surface 56B1 of the pressure application portion 56B when the upper surface 56B1 of the pressure application portion 56B is pressed downward by the rear end portion 20R of the movable unit 20. This may facilitate the opening of the movable unit 20.

As illustrated as FIG. 1, the rear end portion 12R at each side along the width of the stationary unit 12 is engaged with the engagement portion 56A of each of the positioning members 50. This may increase the accuracy of positioning of the first connector 16 with respect to the second connector 36.

FIG. 2 illustrates the movable unit 20 in its closed state with respect to the stationary unit 12, with the rear end portion 12R of the stationary unit 12 placed on the seating portion 54 of the positioning member 50. In this state, the engagement portion 56A of the positioning member 50 is located rearward of the rear end portion 12R of the stationary unit 12 and the rear end portion 20R of the movable unit 20. This may reduce running of the rear end portion 12R onto the engagement portion 56A at the time of engaging the rear end portion 12R of the stationary unit 12 with the engagement portion 56A. Therefore, attachment of the electronic device 10 to the expansion device 30 may be facilitated.

Figure 13:
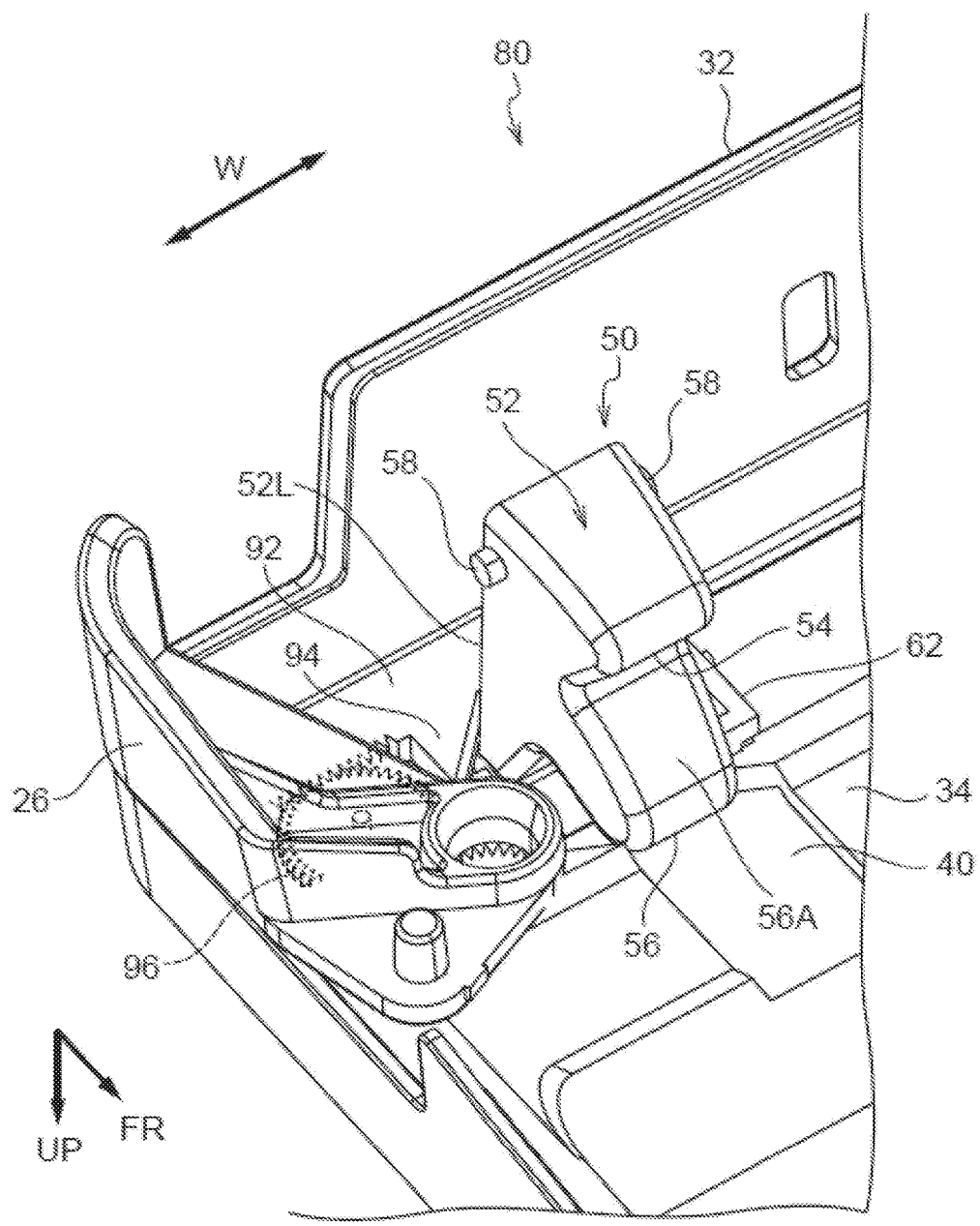
FIG. 13 is an exemplary perspective view of a lift-up mechanism.
Figure 14:
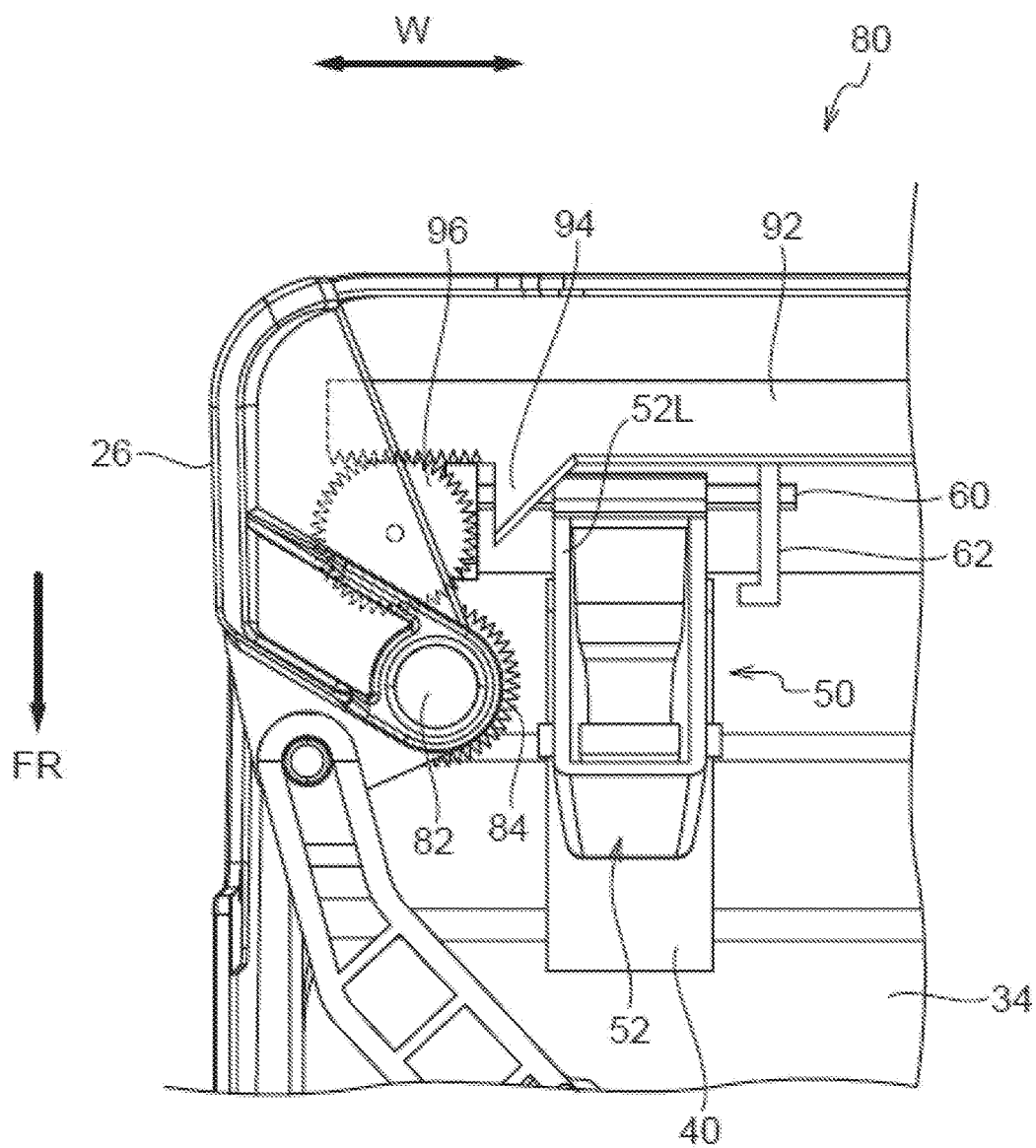
FIG. 14 is an exemplary bottom view of a lift-up mechanism.

FIG. 13 is an exemplary perspective view of a lift-up mechanism. FIG. 13 is a perspective view, as seen diagonally from below, of a lift-up mechanism installed in the expansion device illustrated as FIG. 12. FIG. 14 is an exemplary bottom view of a lift-up mechanism. FIG. 14 is a bottom view, as seen from below, of the lift-up mechanism illustrated as FIG. 13. An expansion device 80 illustrated as FIG. 13 is provided with a lift-up mechanism 90 to lift the positioning member 50 upward in response to operation of the operating lever 26.

For example, when operated by the user, the operating lever 26 pivots about a pivot shaft 82 (see FIG. 14) that extends in the height direction of the housing 32. As illustrated as FIG. 14, the operating lever 26 is provided with a base gear 84 that rotates about the pivot shaft 82 integrally with the operating lever 26. The operating lever 26 may be an example of an operating member.

The lift-up mechanism 90 is coupled to the base gear 84. The lift-up mechanism 90 has a rack 92, and a pinion gear 96. The rack 92 is disposed below the main body portion 52 of the positioning member 50. The rack 92 is able to slide in the width direction of the housing 32.

Figure 15:
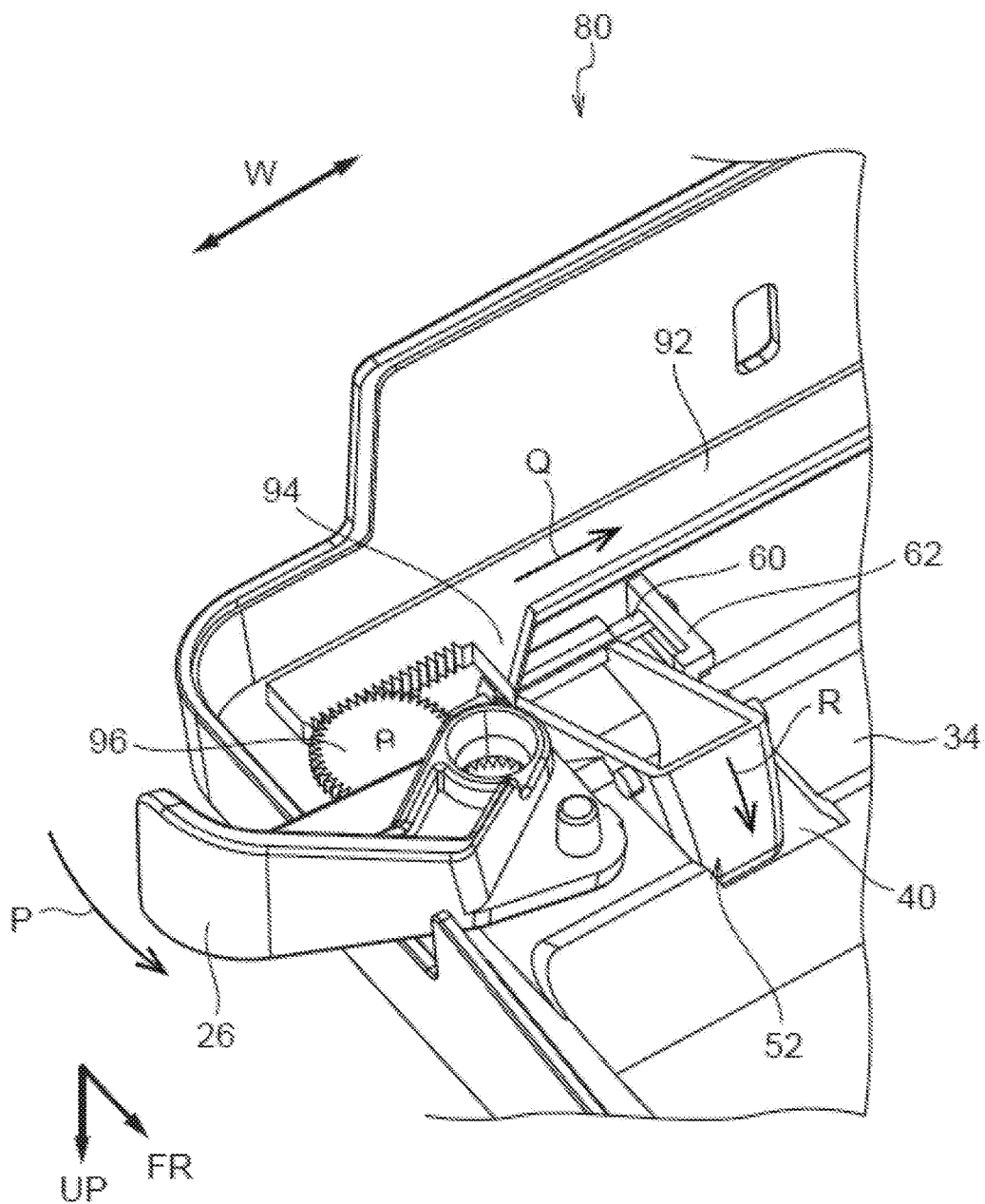
FIG. 15 is an exemplary perspective view illustrating a state in which an operating lever has been operated.
Figure 16:
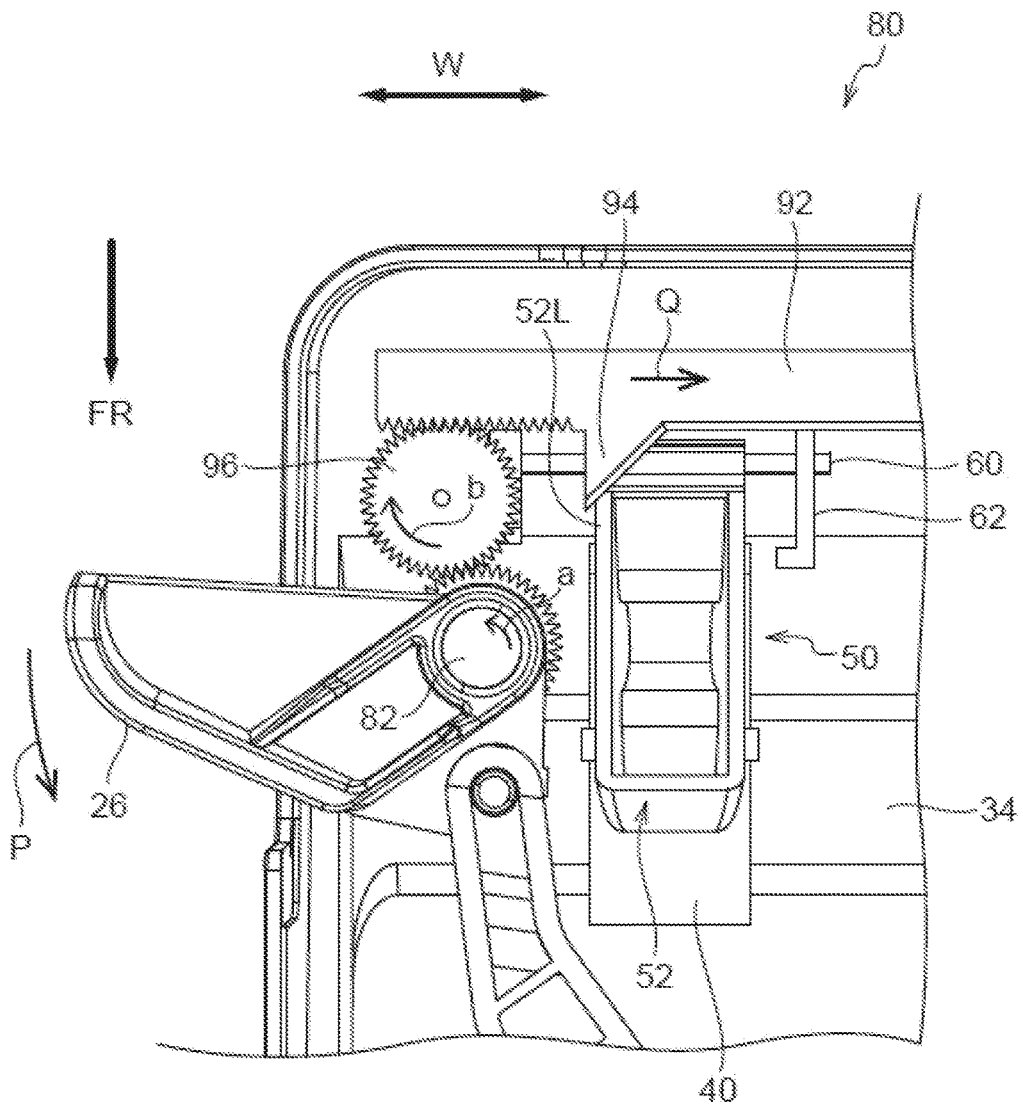
FIG. 16 is an exemplary bottom view of a lift-up mechanism.

FIG. 15 is an exemplary perspective view of an operating lever when operated. FIG. 15 is a perspective view, as seen diagonally from below, of the operating lever illustrated as FIG. 13. FIG. 16 is an exemplary bottom view of a lift-up mechanism. FIG. 16 is a bottom view, as seen from below, of the lift-up mechanism illustrated as FIG. 15. As illustrated as FIGS. 15 and 16, the rack 92 is provided with a push-up portion 94 to push the lower surface 52L of the main body portion 52 upward in response to sliding movement in the width direction of the housing 32. The base gear 84 is coupled to the rack 92 via the pinion gear 96. The pinion gear 96 converts the pivotal movement of the operating lever 26 into linear motion of the rack 92.

As illustrated as FIG. 15, the expansion device 80 illustrated as FIG. 13 operates as described below when the operating lever 26 is operated by the user with the electronic device 10 attached to the expansion device 80.

For example, as illustrated as FIG. 16, the base gear 84 rotates about the pivot shaft 82 in the direction indicated by an arrow "a" integrally with the operating lever 26, and as the base gear 84 rotates, the pinion gear 96 rotates in the direction indicated by an arrow "b". As the pinion gear 96 rotates, the rack 92 slides in the width direction of the housing 32 (arrow Q). As the rack 92 slides, the positioning member 50 is pushed up (arrow R) by the push-up portion 94.

Thus, the rear end portion 12R of the stationary unit 12 is pushed up (the direction indicated by the arrow S in FIG. 4) by the seating portion 54 of the positioning member 50, releasing the connection between the first connector 16 and the second connector 36. This may facilitate detachment of the electronic device 10 from the expansion device 80. When the operating lever 26 is operated, the locking engagement between the locking engagement portion of the stationary unit 12 and the hooks 38 (see FIG. 1) is released.

Since no component for pushing up the electronic device 10 is provided to the housing 32 separately from the positioning member 50, the number of components is reduced.

The lift-up mechanism 90 may be activated as the operating lever 26 is moved pivotally. For example, the lift-up mechanism 90 may be activated as a push button is depressed.

The positioning member 50 may be displaced between the standby position and the connecting position as the positioning member 50 slides in the front-back direction of the housing 32. Alternatively, for example, the positioning member 50 may be displaced between the standby position and the connecting position as the positioning member 50 slides in the width direction of the housing 32.

The positioning member 50 may sink into the housing 32 as the positioning member 50 pivots about the pivot shaft 60. Alternatively, for example, the positioning member 50 may sink into the housing 32 as the positioning member 50 slides in the height direction (top-bottom direction) of the housing 32.

Although the positioning members 50 are provided at both sides in the width direction of the housing 32 of the expansion device 30, the specific arrangement or number of positioning members may be altered as appropriate.

The second connector 36 may project upward from the upper wall portion 34 of the housing 32. The second connector 36 may be disposed inside the housing 32 in a manner that allows the second connector 36 to couple to the first connector 16 that projects from the bottom wall portion 14L of the stationary unit 12.

The electronic device 10 may be a notebook PC, or alternatively, the electronic device 10 may be a DVD player, a portable game machine, an electronic dictionary, or other devices.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An expansion device comprising:
   a first housing onto which an electronic device including a first connector is placed;
   a second connector, provided on a surface of a second housing which faces the first housing, configured to couple to the first connector; and
   a positioning member, including a projecting portion that projects from the second housing, configured to change a position, by a sliding operation with the electronic device being engaged, from a standby position in which the projecting portion is restricted to sink into the second housing to a coupling position in which the projecting portion is allowed to sink into the second housing,
   wherein the projecting portion, when the first connector and the second connector are coupled with each other, sinks into the housing in such a manner that the projecting portion positions under the surface of the second housing.

2. The expansion device according to claim 1, wherein the electronic device includes:
   a stationary unit configured to be placed onto the first housing; and
   a movable unit, coupled to a rear end portion of the stationary unit, configured to come around behind the rear end portion of the stationary unit with releasing the movable unit from the stationary unit, and wherein the positioning member slides from the standby position to the coupling position with the rear end portion of the stationary unit being engaged, and sinks into the second housing with releasing the movable unit from the stationary unit.

3. The expansion device according to claim 2, wherein the positioning member is displaced between the standby position and the coupling position with the sliding operation of the positioning member slides in a front-back direction of the second housing.

4. The expansion device according to claim 3, further comprising:
   a guide portion, provided on the second housing, configured to guide the positioning member from the standby position to the coupling position while restricting the positioning member to sink into the second housing.

5. The expansion device according to claim 4, wherein the positioning member is coupled to the guide portion via a pivot shaft, and sinks into the second housing with a rotating operation about the pivot shaft, and wherein the guide portion guides the positioning member from the standby position to the coupling position while restricting the positioning member to rotate.

6. The expansion device according to claim 5, wherein the pivot shaft includes an engagement surface over an outer peripheral surface, and wherein the guide portion includes a guide passage extending in the front-back direction of the second housing and into which the pivot shaft is inserted with the engagement surface engaged with an inner wall surface of the guide portion.

7. The expansion device according to claim 5, wherein the guide portion includes a pivotal movement-permitting portion, provided in an end portion on the side of the coupling position, configured to allow the positioning member to move rotationally.

8. The expansion device according to claim 7, wherein the pivotal movement-permitting portion includes a pivotal movement-permitting hole coupled to the guide portion and into which the pivot shaft is inserted in a rotatable manner.

9. The expansion device according to claim 5, wherein the positioning member includes:
   a seating portion onto which the rear end portion of the stationary unit is placed; and
   a pressure application portion configured to being pressed into the second housing by the movable unit with releasing the movable unit from the stationary unit, wherein the pivot shaft extends in a width direction of the second housing, and is located at a rear side of the second housing relative to the seating portion and the pressure application portion.

10. The expansion device according to claim 9, wherein an upper surface of the pressure application portion projects from the second housing and has an upward convex shape as viewed in an axial direction of the pivot shaft.

11. The expansion device according to claim 9, wherein the positioning member includes an engagement portion with which the rear end portion of the stationary unit is engaged in the front-back direction of the second housing.

12. The expansion device according to claim 1, further comprising:
   a first elastic member, provided on the second housing, configured to urge the positioning member in a direction from the coupling position toward the standby position.

13. The expansion device according to claim 1, further comprising:
   a second elastic member, provided on second the housing, configured to urge the positioning member in a direction projecting from the second housing.

14. The expansion device according to claim 1, further comprising:
   a lift-up mechanism, provided on the second housing, configured to lift the positioning member sunk into the second housing in a direction projecting from the housing.

15. The expansion device according to claim 14, wherein the lift-up mechanism includes:
   a rack, disposed below the positioning member, configured to slide in the width direction of the second housing; and
   a push-up portion, provided in the rack, configured to push the positioning member upward with a sliding operation of the rack.

16. The expansion device according to claim 1, wherein the second housing is provided with a pair of the positioning members which are spaced apart from each other in a width direction of the second housing, and the pair of positioning members are configured to engage with corresponding rear end portions of the electronic device located at both sides in a width direction of the electronic device.

17. The expansion device according to claim 1, wherein the positioning member projects from an upper wall portion of the second housing through an opening provided at the upper wall portion.

18. The expansion device according to claim 17, wherein the opening is provided with setting a front-back direction of the second housing as a longitudinal direction of the opening, and the positioning member slides along the opening.

19. The expansion device according to claim 1, further comprising:
   a pair of widthwise-positioning portions configured to position the electronic device in a width direction with respect to the second housing.

20. An electronic apparatus comprising:
   an electronic device including:
      a stationary unit including a first connector; and
      a movable unit, coupled to a rear end portion of the stationary unit, configured to come around behind the rear end portion of the stationary unit with releasing the movable unit from the stationary unit; and
   an expansion device including:
      a housing onto which stationary unit is placed;
      a second connector, provided on a surface of the housing which faces the stationary unit, configured to couple to the first connector; and
      a positioning member, including a projecting portion that projects from the housing, configured to change a position, by a sliding operation with the electronic device being engaged, from a standby position in which the projecting portion is restricted to sink into the housing to a coupling position in which the projecting portion is allowed to sink into the housing,
   wherein the projecting portion, when the first connector and the second connector are coupled with each other, sinks into the housing in such a manner that the projecting portion positions under the surface of the second housing.

* * * * *